Patented Jan. 30, 1951

2,539,505

UNITED STATES PATENT OFFICE 2,539,505

PROCESSING OF CANNED FOOD PRODUCTS

Granville F. Barnum, Pittsford, and Edward J. Hanna, Rochester, N. Y., assignors to Taylor Instrument Companies, Rochester, N. Y., a corporation of New York Application October 15, 1947, Serial No. 780,070

4 Claims. (Cl. 99—214)

This invention relates to a method of and to apparatus for processing foods.

In the processing of canned food products in a sealed water-filled retort, provision must be made to agitate the water so that its temperature is maintained uniform throughout the mass. This agitation is effected by bubbling an elastic fluid through the water.

In accordance with the present invention there is provided a novel method of and novel apparatus for effecting the agitation of the water in a cooking retort at a fast rate during the time that the temperature of the water is coming up to the required value and for effecting a slower rate of agitation thereafter, to the end that more efficient and economical operation results.

Figure 1:
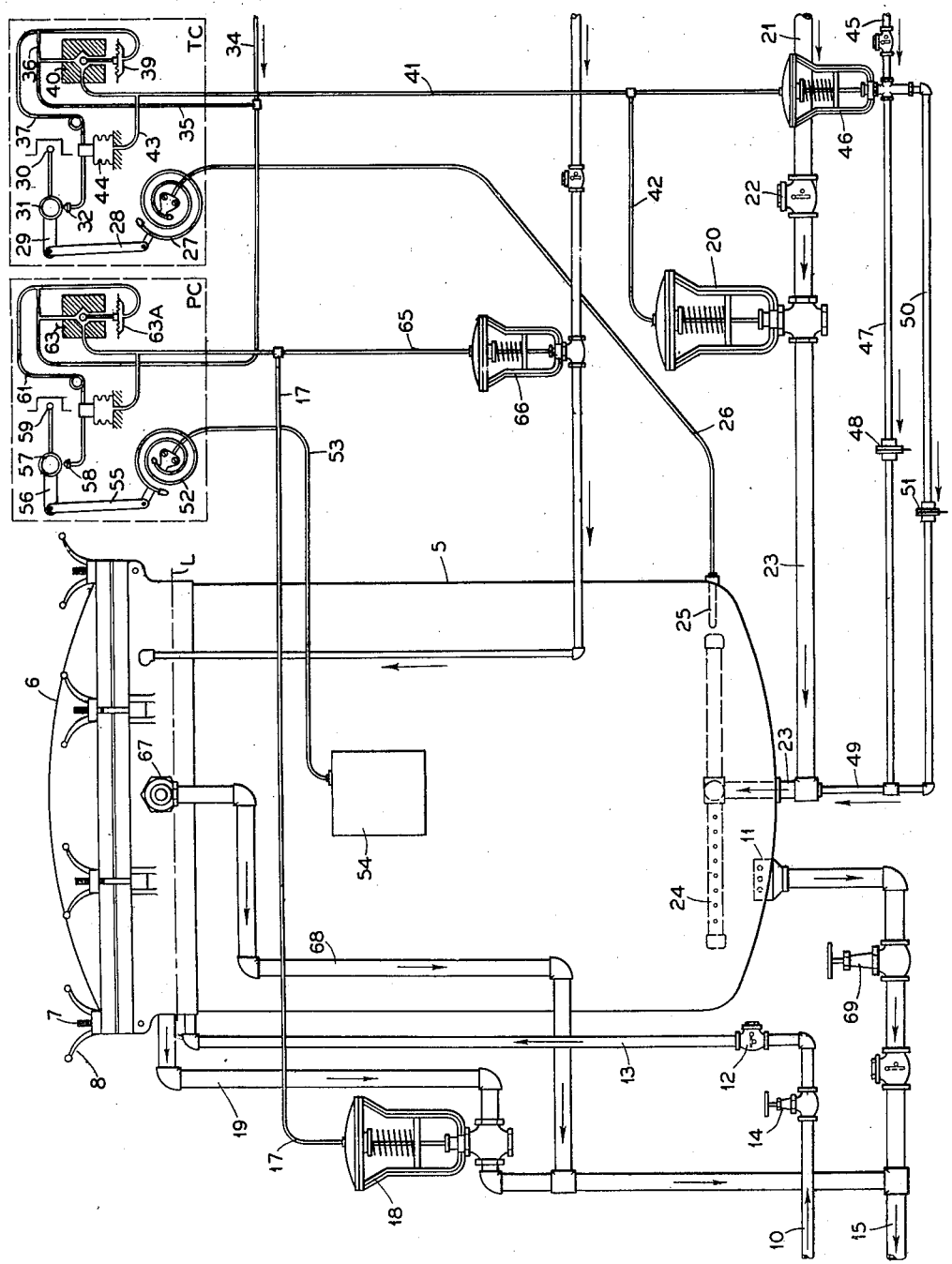
Figure 2:
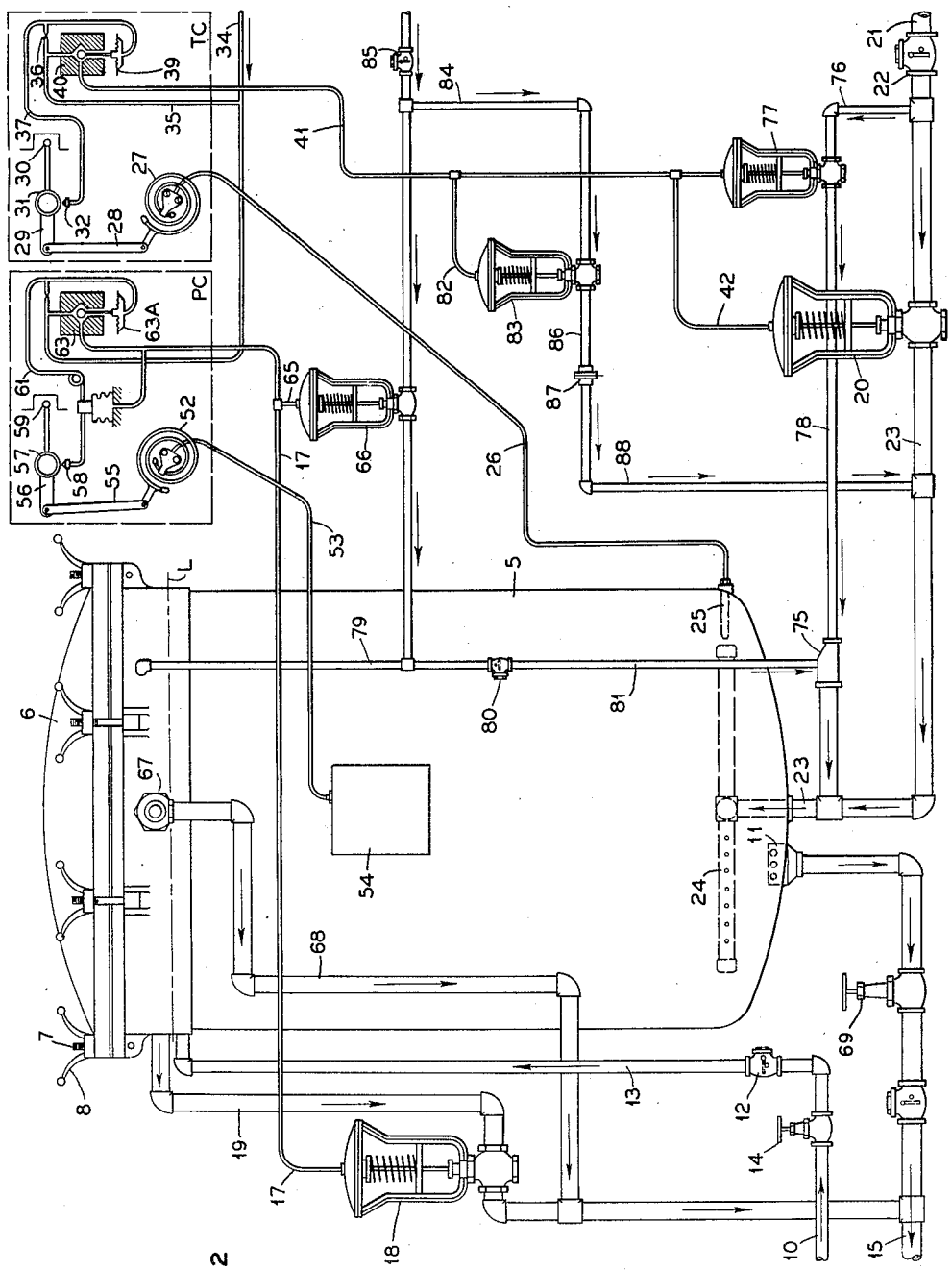

The various features and advantages of the invention will appear from the detailed description and claims when taken with the drawings wherein:

Fig. 1 is a diagrammatic showing of a food processing system incorporating the apparatus of the present invention and by which the method can be practised; and Fig. 2 is a similar diagrammatic showing of a modified form of the invention.

The system of the present invention comprises a retort 5 provided with a cover 6 which can be sealed closed by the bolts 7 and wing nuts 8, engaged thereby. The cooking or sterilizing of the canned food products is effected in a water bath reaching the level L in the retort. Water is supplied to the retort through the pipe 10, hand valve 14, check valve 12 and pipe 13, the flow of the water through the pipes being controlled by the hand valve. Steam and compressed air are introduced into the retort during the processing cycle under the control of temperature controller TC and pressure controller PC, respectively, the operation of which will best be understood by describing the operations thereof during the cooking cycle.

With the retort 5 filled with cans to be processed, and with the level of the water at the height indicated by the broken line at L, the retort cover is sealed closed by the wing nuts 8. The temperature controller TC is set to maintain the temperature at a predetermined value within the retort while the pressure controller PC is likewise set to maintain a predetermined pressure as a result of the introduction of compressed air into the retort at the beginning of the cycle and throughout the cycle if any air leaks from the retort. Since the temperature of the water within the retort is below the predetermined value at the beginning of the cycle, the motor diaphragm valve 20 is maintained open by the temperature controller, to permit steam to flow through the pipe 21, check valve 22 and thence through the valve 20, pipe 23 and the jet 24 which comprises perforated horizontal pipes in the bottom of the retort. With the temperature of the water below the predetermined value, this condition will be indicated by the temperature controller TC comprising a thermosensitive tube system having a bulb 25 communicating through the capillary tube 26 to the interior of the Bourdon spring 27. This tube system is filled with a thermosensitive medium which expands on an increase in temperature and contracts on a decrease in temperature. Since the temperature is below that desired, the Bourdon spring 27 will be in its coiled condition whereby the link 28 will elevate the left end of the baffle lever 29, which is pivoted at 30. The baffle lever carries a baffle 31 located in cooperating relation with the nozzle 32. Compressed air continuously leaks through the nozzle in amounts related to the space between the baffle and the nozzle, this air being supplied through the pipes 34 and 35, orifice 36 and thence through pipe 37 to the nozzle 32. Since the baffle 31 at this time is positioned at a relatively greater space from the nozzle 32, the back pressure in the nozzle will be lowered so that the capsular chamber 39 tends to open the relay valve 40. The relay valve 40 permits increased air pressure to be applied through the papes 41 and 42 to the motor diaphragm valve 20, to open it. This increased air pressure is also applied through the pipe 43 to the bellows 44 tending to cause this bellows to expand in a direction so that the space between the nozzle 32 and the baffle 31 is reduced. This enables the controller to effect a throttling action.

In order to maintain a uniform temperature within the retort, circulation of this water must be effected at least throughout the cooking portion of the cycle. This circulation is especially needed during the period that the water in the retort is being heated to the desired temperature, a period which is commonly referred to as the "come-up" time. The steam introduced through the pipes 21 and 23 and through the jet 24 into the retort, develops bubbles which rise through the body of the water to the air in the head space at the top of the tank thereby promoting circulation or agitation. This circulation is not adequate to effect the maximum temperature rise in the minimum time. Therefore, the circulation effected by the mentioned steam is supplemented by compressed air which is supplied through the pipe 45 by three-way motor diaphragm valve 46, pipe 47, large orifice plate 48, pipe 49 and thence through pipe 23 and the jet 24 into the bottom of the retort. This compressed air as it rises through the body of water also effects circulation in a manner similar to that effected by the steam. It will be noted that during the "come-up" period, the pipe 41 from the output of the temperature controller TC communicates not only with the pipe 42 leading to the motor diaphragm valve 20 but also with the motor diaphragm top of the valve 46. Both the valves 20 and 46 are maintained open until the predetermined temperature is reached. When, however, that temperature is reached, the thermosensitive tube system including the Bourdon spring 27 will have uncoiled an amount to correspond to this temperature, with the result that the link 28 will position the baffle 31 with respect to the nozzle 32 so that the back pressure in the nozzle will be increased. This increased back pressure is applied through the pipe 37 to the capsular chamber 39 tending to close the relay valve 40. With the reduction in the air pressure in the pipe 41, the diaphragm valves 20 and 46 will be closed. However, if the temperature within the retort drops below the predetermined value, from time to time, the temperature controller TC will operate to open the steam valve 20 until the required temperature is restored. During such period compressed air will also be supplied through the pipe 45, valve 46, pipe 47, orifice 48 and pipes 49 and 23 as previously described, to effect increased circulation of the water within the retort.

Even though the temperature within the retort is at the required value it is still desirable to effect circulation of the water within the retort so that the temperature may be maintained uniform therein. For this reason a smaller amount of compressed air is bubbled through the water in the retort. The compressed air in this instance is supplied from the pipe 45, three-way valve 46, through the alternate port of this valve, pipe 50, small orifice plate 51, and pipes 49 and 23 into the retort.

It was mentioned that when the retort is closed and the compressed air turned on, the pressure controller PC functions to bring about and maintain the predetermined air pressure in the head space in the retort. Until the pressure controller applies compressed air at a pressure of from eleven to nineteen pounds per square inch through the pipe 17 to the top of the motor diaphragm valve 18, this valve remains closed since it requires pressure on its diaphragm in the mentioned range before it opens. Valve 18 in its closed condition closes the discharge pipe 19 leading to the drain pipe. Throughout the cooking and cooling portion of the process cycle, pressure controller PC maintains the predetermined pressure within the head space of the retort if perchance any of the original air pressure therein leaks away. The controller PC includes a Bourdon spring 52 which communicates through a pipe 53 opening into the retort so that the spring responds to the pressure therein. Preferably this pipe opens into a chamber 54 which in turn communicates with the interior of the retort. The Bourdon spring 52 operates through a link 55 to position the baffle lever 56 and its baffle 57 in proper cooperative relation with respect to the nozzle 58, the lever 56 being pivotally supported at 59. At the beginning of the cycle when the pressure within the retort is below the required value, the Bourdon spring 52 will be coiled up and will operate through the link 55 and lever 56 to move the baffle 57 toward the nozzle 58. The back pressure at the nozzle 58 will therefore be increased. This back pressure is applied through the pipe 61 to the capsular chamber 63A tending to expand it, and thereby tending to close the relay valve 63. This causes reduced pressure in the pipe 17 to maintain the closure of the diaphragm motor valve 18 as mentioned. However, this reduced air pressure is also applied through the pipe 65 to the diaphragm top of the motor valve 66 which is of the type that tends to open unless air pressure in the range of two to ten pounds per square inch is applied to its diaphragm motor. In other words the valve 66 is of the type that requires the application of compressed air thereto for closing. If, however, the pressure within the retort should reach an undesirably high value, a pop valve 67 is provided which communicates through the pipe 68 with the drain pipe 15.

At the end of the cooking cycle, the hand valve 14 in the water pipe 13 is opened so that cooling water can be introduced into the top of the retort. As the cooling water flows into the retort, the pressure therein rises. In response to this increase in pressure valve 18 in pipe 19 leading to the drain, opens. In this way the desirable pressure is maintained on the outside of the cans and the surplus cooling water in the retort can be drained away. The remaining operations of the retort and its controls during the cycle are effected in the usual manner. If it is desired to drain the retort at the conclusion of any cycle, the hand valve 69 is opened, whereupon the water flows through the outlet 11 and hand valve 69 to the drain pipe 15.

In the modified form of the invention shown in Fig. 2, like parts of the system having like functions with those disclosed in Fig. 1, are identified by the same reference characters. The operations of those identical portions will not be repeated since the operation thereof will be understood from the description relating to Fig. 1. In this form of the invention, the circulation of the water within the retort is effected by means of an ejector 75 to which steam is supplied from the steam supply 21 through branch pipe 76, motor diaphragm valve 77, pipe 78 and thence through the ejector 75, the pipe 23 and the jet 24 into the retort. It will be understood that as the steam passes through the ejector it will draw air from the head space at the top of the retort, through pipe 79, check valve 80, pipe 81, ejector 75, pipe 23 and jet 24. The air thus drawn from the head space bubbles upward through the retort water to effect agitation of the same. Steam is thus supplied to the retort through the pipes 23 and 78 until the temperature of the retort water reaches the predetermined value. At that time, the temperature controller TC functions by closing the relay valve 40 to shut off compressed air from pipe 41 and from the diaphragm motor tops of valves 20 and 77 which thereupon close. These last-named valves remain closed as long as the given temperature prevails in the retort. The shutting off of compressed air from pipe 41 removes the air pressure previously applied through branch pipe 82 to the motor top of valve 83. This valve is of the type that opens when air pressure is removed from its motor.

When the given temperature value is reached in the retort, steam will no longer be supplied to the retort, except as required to maintain said temperature. However, circulation or agitation of the water in the retort should be continued throughout the heating portion of the processing cycle. This agitation is effected at this time by compressed air supplied through pipe 84, valve 83 (now open), pipe 86, orifice plate 87, pipes 88 and 23, and jet 24. The size of the orifice in plate 87 can be selected so that just the right amount of air will pass therethrough to provide the necessary agitation of the water.

The present invention provides adequate circulation of the water in the processing retort with an economical use of circulating fluid.

What we claim is:

1. The method of cooking and processing canned foods in a sealed retort which method comprises filling the retort with water except for a shallow head space that is filled with air, introducing a heating fluid and a pressure fluid into the sealed retort for maintaining predetermined temperature and pressure conditions therein, the heating fluid being introduced under pressure through a main path into the bottom of the retort, introducing pressure fluid through a branch path into the bottom of the retort whereby bubbles rise through the water to the head space to effect circulation of the water until the predetermined temperature is reached in said retort, thereupon closing said main path and said branch path responsive to the attainment of the predetermined temperature, and then continuously supplying compressed air from a source outside of said retort into the bottom of the retort whereby bubbles rise through the water to effect continuous circulation of the water until the end of the cooking period.

2. The method of cooking and processing canned foods in a sealed retort which comprises filling the retort with water except for a shallow head space that is filled with air, introducing steam and compressed air into the retort for maintaining predetermined temperature and pressure conditions therein, the steam being introduced into the bottom of the retort under pressure through a main path and through a branch path into the bottom of the retort whereby bubbles rise through the water to effect circulation until the predetermined temperature is reached in said retort, thereupon closing both of said paths and substituting an alternate branch path in response to the attainment of the predetermined temperature, and then continuously supplying compressed air from a source outside of said retort into the bottom of the retort through said alternate branch path whereby bubbles continue to rise through the water to said head space to effect continuous circulation of the water until the end of the cooking period.

3. The method of cooking and processing canned foods in a sealed retort which method comprises filling the retort with water except for a head space that is filled with air, introducing steam and a compressed fluid into the retort for maintaining predetermined temperature and pressure conditions therein, the steam being introduced under pressure into the bottom of the retort through a main path, introducing air under pressure through a supplemental path into the bottom of the retort whereby bubbles continue to rise through the water to said head space to effect circulation until the predetermined temperature is reached in said retort, thereupon closing said main path and restricting said supplemental path responsive to the attainment of the predetermined temperature, and then continuously supplying compressed air into the bottom of the retort through said restricted supplemental path whereby bubbles continue to rise through the water to said head space to effect continuous circulation of the water until the end of the cooking period.

4. The method of cooking and processing canned foods in a sealed retort which comprises filling the retort with water above the food except for a shallow head space that is filled with air, which method comprises introducing steam and compressed air into the retort for maintaining predetermined temperature and pressure conditions therein, the steam being introduced under pressure through a main path discharging into the bottom of the retort, aspirating air from said head space into the bottom of the retort by the application of a compressed elastic fluid to effect circulation until the predetermined temperature is reached in said retort, at which time both of said paths are closed responsive to the attainment of the predetermined temperature, and then continuously supplying a stream of compressed air into the bottom of the retort whereby bubbles continue to rise through the water to said head space to effect continuous circulation of the water until the end of the cooking and cooling period.

GRANVILLE F. BARNUM.
EDWARD J. HANNA.

REFERENCES CITED

The following references are of record in the file of this patent:

UNITED STATES PATENTS

| Number | Name | Date |
| --- | --- | --- |
| 1,184,251 | Luhrmann | May 23, 1916 |
| 1,627,770 | Durkee | May 10, 1927 |
| 1,636,768 | Ford | July 26, 1927 |
| 1,709,481 | Mullen | Apr. 16, 1929 |
| 1,732,321 | White | Oct. 22, 1929 |
| 2,051,391 | Raney | Aug. 18, 1936 |